ATTACHING DEVICE FOR INDEX PAD

Filed Feb. 25, 1966

INVENTOR.
ALFRED L. EDWARDS
BY Frank C. Leach Jr.
ATTORNEY.

3,368,296

ATTACHING DEVICE FOR INDEX PAD

Alfred L. Edwards, Cookeville, Tenn., assignor to American Merchandising, Inc., Louisville, Ky., a corporation of Kentucky

Filed Feb. 25, 1966, Ser. No. 530,078
10 Claims. (Cl. 40—336)

Figure 1:
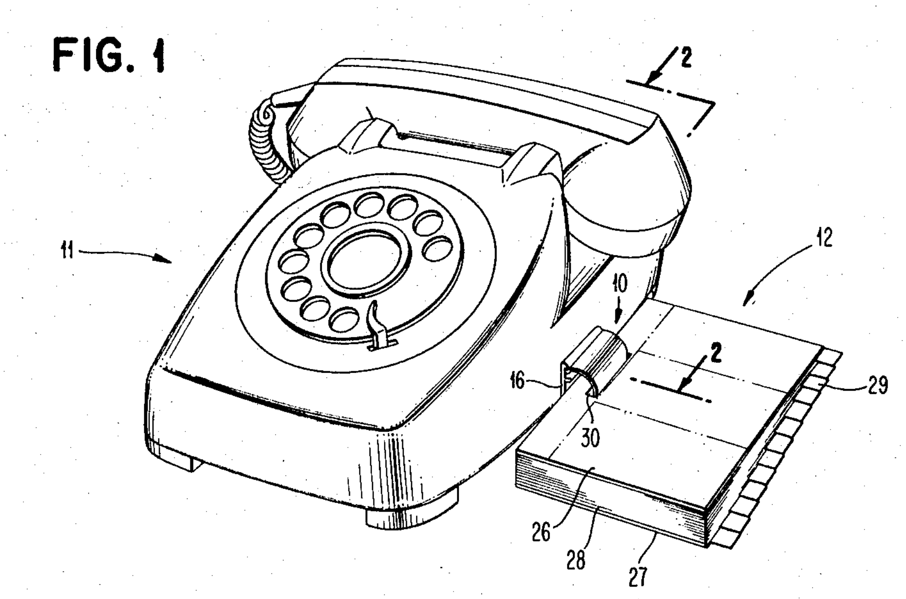

This invention relates to an attaching device for an index pad or the like and, more particularly, to a device for attaching an index pad or the like to a telephone or the like.

Because of the large number of digits in telephone numbers, it is difficult for one to remember frequently called telephone numbers. Accordingly, various types of booklets or pads with appropriate index indicators are employed. However, these booklets or pads can easily become misplaced or lost. When this occurs, time must be spent to find the booklet or pad. Thus, the value of having the frequently called telephone numbers in an index booklet or pad is substantially decreased when time must be expended to locate the booklet or pad.

The present invention satisfactorily overcomes this problem by providing a device for quickly attaching an index pad to a telephone. Thus, whenever one intends to call one of the frequently called numbers, the index pad is readily avaliable since it is attached to the telephone. Accordingly, no time is lost in having to locate the index pad.

It is contemplated that the attaching device and index pad of the present invention will be distributed as a free gift to telephone users by merchants. The relatively low cost of the attaching device and index pad of the present invention will permit this.

The attaching device of the present invention must be quickly and easily attachable to the telephone. Furthermore, the device must be attached to the telephone so as to not be accidentally detached therefrom. The present invention meets these requirements since it is both easily attachable to the telephone and will not be accidentally deached therefrom.

The index pad must be connected to the attaching device so that the various pages of the index pad may be readily moved with respect to each other without tearing or otherwise damaging them. This requirement is met by the present invention since it utilizes a hinge connection between the attaching device and the pages and covers of the index pad.

The index pad also should be disposed adjacent the telephone while utilizing only a small additional space. The present invention satisfactorily meets this requirement by employing a compact attaching device that permits the index pad to be disposed adjacent the telephone.

An object of this invention is to provide an index pad attachment for a telephone or the like that may be quickly and easily attached thereto.

Another object of this invention is to provide an index pad for handy use with a telephone or the like.

Other objects of this invention will be readily perceived from the following description, claims, and drawing.

This invention relates to a device adapted to be attached to a support structure. The device includes a base having first means extending from a surface thereof. Second means extends from the surface of the base in spaced relation to the first means. The first means and the second means cooperate together to attach the device to the support structure. Third means, spaced from the second means, extends from the surface of the base. The second means and the third means have cooperating means to form a closed connection therebetween to permit the third means to function as a hinge for an index pad or the like. The base extends beyond the third means to support the index pad or the like when the device is attached to the support structure.

This invention also relates to a combination of an index pad and a device for attaching the index pad to a support structure. The device includes a base having first means extending from a surface thereof. Second means extends from the surface of the base in spaced relation to the first means. The first means and the second means cooperate with each other to attach the device to the support structure. Third means extends from the surface of the base in spaced relation to the second means. The second means and the third means have cooperating means at their free ends to form a closed connection therebetween. The third means functions as a hinge for the index pad when the third means forms a closed connection with the second means. The index pad has means to connect the index pad to the third means. The base extends beyond the third means to form a support for the index pad.

Figure 2:
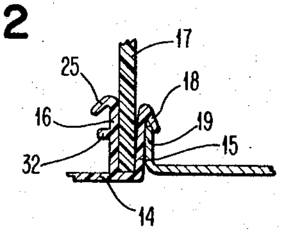
Figure 3:
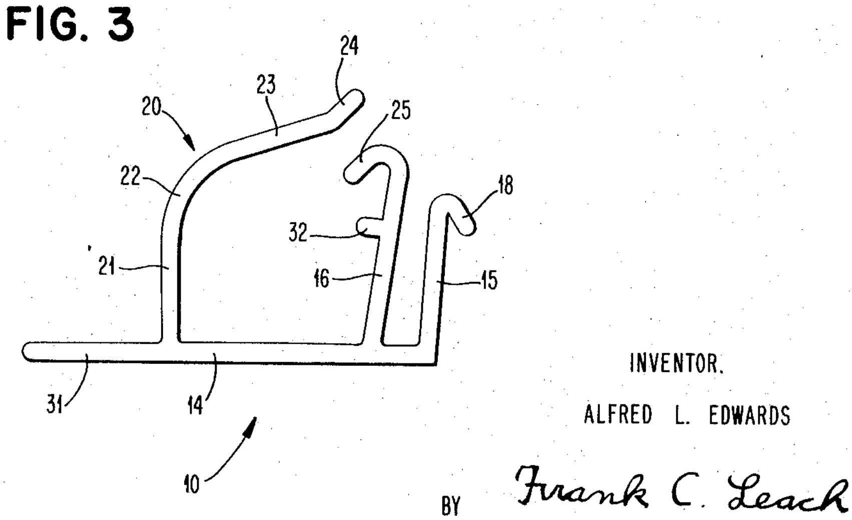

The attached drawing illustrates a preferred embodiment of the invention, in which FIGURE 1 is a perspective view showing the attaching device and index pad of the present invention connected to a telephone for use therewith;

FIGURE 2 is a sectional view of a portion of the attaching device and the telephone of FIGURE 1 and taken substantially along line 2—2 of FIGURE 1; and FIGURE 3 is a side elevational view of the attaching device of the present invention.

Referring to the drawing and particularly to FIGURE 1, there is shown an attaching device 10, which is connected to a telephone 11. The attaching device 10 has an index pad 12 hingedly connected thereto.

The attaching device 10 includes a base 14, which is relatively small in comparison with the size of the index pad 12. As shown in FIGURE 3, a first wall or member 15 extends upwardly from a top surface of the base 14 at one end thereof. The first wall 15 preferably is disposed at a slight angle with respect to the vertical.

A second wall or member 16 extends upwardly from the top surface of the base 14 in spaced relation to the first wall 15. The second wall 16 is inclined at a greater angle to the vertical than the first wall 15 so that the distance between the adjacent surfaces of the walls 15 and 16 decreases away from the base 14. Thus, when a housing wall 17 (see FIGURE 2) of the telephone 11 is disposed between the walls 15 and 16, there is a clamping effect therebetween to attach or connect the attaching device 10 to the telephone 11.

The free end of the first wall 15 has a hook 18 formed thereon. The hook 18 preferably extends at an angle of 60° to the horizontal. As shown in FIGURE 2, the hook 18 fits over an upstanding flange 19 on the base or bottom of the telephone 11. This arrangement prevents any accidental displacement of the attaching device 10 from the telephone 11 after the device 10 is attached to the telephone 11.

A third wall or member 20 extends upwardly from the top surface of the base 14. The third wall 20 includes a first straight portion 21, which extends substantially perpendicular from the base 14. The third wall 20 has a curved portion 22, which connects the first straight portion 21 with a second straight portion 23. The portion 23 is disposed at an angle to the horizontal.

The third wall 20 terminates in a finger 24, which is adapted to cooperate with a hook 25 on the free end of the second wall 16 to form a closed connection therebetween as shown in FIGURE 1. As shown in the unconnected position of FIGURE 3, the finger 24 and the hook 25 have substantially parallel surfaces with each being disposed at an angle of approximately 45° to the vertical.

The index pad 12 is hingedly connected to the third wall 20 of the attaching device 10. The index pad 10 comprises a front cover 26 and a back cover 27. Each of the covers 26 and 27 preferably is formed of genuine press board, which is available from Case and Risley Press Paper, Inc., Oneco, Conn.

The index pad 12 also comprises a plurality of pages 28, which are formed of a suitable writing material such as white tagboard, between the covers 26 and 27. Any other suitable heavy material on which names and numbers may be written may be satisfactorily employed instead of white tagboard. Each of the pages 28 has a tab 29, which extends beyond the perimeters of the covers 26 and 27, to permit the user to find the desired listing rapidly.

Each of the front cover 26, the back cover 27, and the pages 28 has a slot 30 (see FIGURE 1) formed therein to permit a hinge attachment of the front cover 26, the back cover 27, and the pages 28 to the third wall 20. Thus, in assembling the index pad 12 on the attaching device 10, the back cover 27 is first attached to the third wall 20 by inserting the third wall 20 through the slot 30 in the back cover 27, then the pages 28 are attached by inserting the third wall 20 through the slots 30 in the pages 28, and finally the front cover 26 is attached by inserting the third wall 20 through the slot 30 in the front cover 26.

Thereafter, the upper part of the third wall 20 is moved downwardly until the finger 24 is disposed beneath the hook 25 of the second wall 16 to form a closed connection therebetween. The closed connection results in a hinge for the index pad 12 being formed by the third wall 20. Thus, the front cover 26 and one or more of the pages 28 may be readily moved about the third wall 20 to permit the desired page 28 on which the phone number is disposed to be readily available for viewing.

The base 14 has a portion 31 extending beyond the third wall 20 to form a support for the index pad 12, particularly when the telephone 11 is lifted from the stand or other structure on which it is resting. As shown in FIGURE 3, the portion 31 extends beyond the third wall 20 a distance slightly less than the distance between the second wall 16 and the third wall 20. Furthermore, the distance between the second wall 16 and the third wall 20 is much greater than the maximum distance, which is at the base 14, between the first wall 15 and the second wall 16.

The second wall 16, which extends from the base 14 for a greater distance then the first wall 15, has a stop 32 extending from its side, which is toward the third wall 20. The stop 32, which is disposed approximately the same distance from the base 14 as the end of the hook 18, limits the downward movement of the third wall 20 when it is desired to remove the finger 24 from engagement with the hook 25 of the second wall 16. If the stop 32 were not provided, the possibility of the third wall 20 being broken exists due to the third wall 20 being moved too far in a downward direction. This would occur when it is desired to remove the third wall 20 from its closed connection with the second wall 16 to replace some of the pages 28 or to add additional pages 28.

It should be understood that the walls 15, 16, and 20 preferably extend for the width of the base 14. Likewise, the hooks 18 and 25 and the stop 32 preferably extend for the width of the base 14.

The attaching device 10 may be formed of any material having sufficient resiliency to allow sufficient movement of the third wall 20 to permit insertion of the finger 24 within the hook 25 of the second wall 16 and to permit the hook 18 to move past the upstanding flange 19 on the base of the telephone 11. The material is preferably rigid polyvinyl chloride, high density polyethylene, polyallomer, or polypropylene. As previously mentioned, it is contemplated that the present invention will be utilized as a specialty advertising device for merchants. Thus, the front cover 26 of the index pad 12 would have the advertisement of the merchant or merchants thereon.

When the present invention is presented as a gift from the advertisers, the third wall 20 preferably will form the closed connection with the second wall 16 with the index pad 12 already connected thereto. Thus, it is only necessary for the user to dispose the housing wall 17 of the telephone 11 between the first wall 15 and the second wall 16. When the housing wall 17 of the telephone 11 contacts the base 14, the hook 18 of the first wall 15 will be so disposed that it fits over the upstanding flange 19 of the bottom of the telephone 11 as shown in FIGURE 2. With this arrangement, the attaching device 10 cannot be accidentally disconnected from the telephone 11.

It should be understood that the attaching device 10 and the index pad 12 of the present invention may be employed with structures other than the telephone 11. Thus, the present invention may be utilized with any support structure in which it is desirable to have an index pad disposed adjacent the support structure.

While the pages 28 of the index pad 12 have been disclosed as usable by one writing down the phone numbers of frequently called numbers with the tabs 29 having alphabetical arrangements thereon, it should be understood that other arrangements of the pages 28 and the tabs 29 could be employed. For example, the tabs 29 could indicate various available services for a visitor to a hotel or motel. In this arrangement, the numbers would already be listed on each of the pages 28 with each of the tabs 29 listing a service such as "Car Rentals," for example.

An advantage of this invention is that it is compact in comparison with the telephone with which it is used. Another advantage of this invention is that it has a relatively low cost. A further advantage of this invention is that it may be easily attached to the telephone. Still another advantage of this invention is that it is sturdy and strong.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A device adapted to be attached to a support structure, said device including a base, first means extending from a surface of said base, second means extending from said surface of said base in spaced relation to said first means, said first means and said second means cooperating together to attach said device to the support structure, third means extending from said surface of said base and spaced from said second means, said second means and said third means having cooperating means to form a closed connection therebetween to permit said third means to function as a hinge for an index pad or the like, and said base extending beyond said third means to form a support for the index pad or the like when said device is attached to the support structure.

2. The device according to claim 1 in which said first means and said second means are walls with the distance therebetween decreasing away from said base.

3. The device according to claim 2 in which said third means is a wall with the distance between said third wall and said second wall at said base being greater than the distance between said second wall and said first wall at said base.

4. The device according to claim 3 in which said cooperating means on said second wall and said third wall comprises a hook at the free end of said second wall and a finger at the free end of said third wall with said finger disposed within said hook to form the closed connection therebetween.

5. The device according to claim 4 in which said first wall has a hook formed at its end for cooperation with the support structure.

6. The device according to claim 3 in which a stop is disposed on said second wall on the side towards said third wall to limit the downward movement of said third wall when said finger of said third wall is removed from said hook of said second wall to open the closed connection between said second wall and said third wall.

7. The device according to claim 5 in which a stop is disposed on said second wall on the side towards said third wall to limit the downward movement of said third wall when said finger of said third wall is removed from said hook of said second wall to open the closed connection between said second wall and said third wall, said stop being disposed approximately the same distance from said surface of said base as the end of said hook on said first wall.

8. The combination of an index pad and a device for attaching said index pad to a support structure, said device including a base, first means extending from a surface of said base, second means extending from said surface of said base in spaced relation to said first means, said first means and said second means cooperating with each other to attach said device to the support structure, third means extending from said surface of said base in spaced relation to said second means, said second means and said third means having cooperating means at their free ends to form a closed connection therebetween, said third means functioning as a hinge for said index pad when said third means forms the closed connection with said second means, said index pad having means to connect said index pad to said third means, and said base extending beyond said third means to form a support for said index pad.

9. The combination according to claim 8 in which each of said first, second, and third means is a wall with said first wall being disposed at one end of said base.

10. The combination according to claim 9 in which said index pad comprises a plurality of separate portions and said index pad connecting means is a slot in each of said portions of said index pad through which said third wall extends.

References Cited

UNITED STATES PATENTS

| | | | |
|---|---|---|---|
| 1,625,895 | 4/1927 | Katz | 40—339 XR |
| 2,036,010 | 3/1936 | Atkins | 179—146 |
| 2,563,709 | 8/1951 | Ehrler | 281—15 |

JEROME SCHNALL, *Primary Examiner.*

W. H. GRIEB, *Examiner.*